US00RE40287E

(19) United States
(12) Reissued Patent
Tully et al.

(10) Patent Number: US RE40,287 E
(45) Date of Reissued Patent: *May 6, 2008

(54) ANGULAR ORIENTATION CONTROL SYSTEM FOR FRICTION WELDING

(75) Inventors: Lowell R. Tully, Elkhart, IN (US); Stephen A. Johnson, South Bend, IN (US); Dave Konieczny, Union Mills, IN (US); Stephen R. Estes, South Bend, IN (US)

(73) Assignee: SSD Control Technology, Inc., South Bend, IN (US)

( * ) Notice: This patent is subject to a terminal disclaimer.

(21) Appl. No.: 10/988,448

(22) Filed: Nov. 12, 2004

(Under 37 CFR 1.47)

Related U.S. Patent Documents

Reissue of:
(64) Patent No.: 5,858,142
Issued: Jan. 12, 1999
Appl. No.: 09/987,493
Filed: Dec. 9, 1997

U.S. Applications:
(63) Continuation of application No. 09/759,823, filed on Jan. 12, 2001, now Pat. No. Re. 39,019.
(60) Provisional application No. 60/038,332, filed on Feb. 27, 1997.

(51) Int. Cl.
*B32B 37/00* (2006.01)
*B29C 65/06* (2006.01)

(52) U.S. Cl. ..... 156/73.5; 156/64; 156/580; 228/114.5

(58) Field of Classification Search ..... 156/64, 156/73.5, 358, 580; 264/68; 228/112.1, 113, 228/114.5, 2.1, 2.3
See application file for complete search history.

(56) References Cited

U.S. PATENT DOCUMENTS

| | | | | | |
|---|---|---|---|---|---|
| 4,552,609 | A | * | 11/1985 | Larsen | 156/358 |
| 4,552,612 | A | * | 11/1985 | Fortuna et al. | 156/494 |
| 4,584,037 | A | * | 4/1986 | Fortuna et al. | 156/69 |
| 4,606,489 | A | | 8/1986 | Steinhart et al. | |
| 4,741,788 | A | * | 5/1988 | Clark et al. | 156/64 |
| 4,743,331 | A | * | 5/1988 | Nuttall et al. | 156/358 |
| 5,064,485 | A | * | 11/1991 | Smith et al. | 156/69 |
| 5,108,539 | A | * | 4/1992 | Kelley et al. | 156/580 |
| 5,137,166 | A | * | 8/1992 | Unger et al. | 220/613 |
| 5,152,855 | A | * | 10/1992 | Jansman et al. | 156/73.5 |

* cited by examiner

*Primary Examiner*—James Sells
(74) *Attorney, Agent, or Firm*—Marshall, Gerstein & Borun LLP

(57) ABSTRACT

A method of friction welding first and second parts together at an angular orientation relative to each other includes the steps of mounting the first part in a spindle for axial rotation and the second part in a non-rotatable holder. The spindle is then rotated and the angular orientation of the first part relative to the second part is determined at any specific time. The holder is moved toward the spindle to bring the second part into frictional contact with the first part at a selected one of the specific times that the angular orientation is determined. Accordingly, due to frictional contact, the respective contacting surface of the parts are melted. The speed of the rotation of the spindle is then decreased and the holder is moved toward the spindle to forcibly urge the first and second parts together at the contacting surface. Rotation of the spindle is stopped at a specific determined angular orientation of the first part relative to the second part while continuing to forcibly urge the parts together to allow cooling and fused solidification of the contacting surfaces.

41 Claims, 7 Drawing Sheets

SERVO SYSTEM AND VELOCITY CONTROL

INPUT REGISTER 38

| REFERENCE NUMBER | DESCRIPTION |
|---|---|
| 6 | MATERIAL CONSTANT (mC) |
| 8 | GEOMETRIC CONSTANT (gC) |
| 42 | DESIRED FINAL POSITION |
| 73 | MATERIAL TYPE |
| 75 | WORKPIECE WEIGHT |
| 77 | GEOMETRIC PROPERTIES |
| 76 | LENGTH OF FIRST WORKPIECE |
| 78 | LENGTH OF SECOND WORKPIECE |
| 80 | DESIRED LENGTH OF FINISHED PRODUCT |

FIG. 6

OUTPUT REGISTER 70

| REFERENCE NUMBER | DESCRIPTION |
|---|---|
| 39 | DESIRED ANGULAR POSITION |
| 44 | DESIRED TOTAL SPINDLE ROTATIONS |
| 46 | DESIRED ACCELERATION ROTATIONS |
| 48 | DESIRED PRE-HEAT ROTATIONS |
| 49 | DESIRED HEATING ROTATIONS |
| 50 | DESIRED FORGE ROTATIONS |
| 51 | ACTUAL FORGE ROTATIONS |
| 53 | DESIRED ROTATIONAL SPEED |
| 61 | REQUIRED TIME AT PRE-HEAT FORCE LEVEL |
| 63 | PRE-HEAT DISTANCE |
| 65 | REQUIRED TIME AT HEAT FORCE LEVEL |
| 67 | HEAT DISTANCE |
| 69 | REQUIRED TIME AT FORGE FORCE LEVEL |
| 71 | FORGE DISTANCE |
| 72 | ROTATIONAL MOMENT OF INERTIA |
| 74 | TARGET UPSET DISTANCE |
| 79 | PRE-HEAT FORCE LEVEL |
| 81 | HEAT FORCE LEVEL |
| 83 | FORGE FORCE LEVEL |
| 120 | DESIRED SPINDLE PROFILE |

FIG.7

ANGULAR ORIENTATION CONTROL SYSTEM FOR FRICTION WELDING

Matter enclosed in heavy brackets [ ] appears in the original patent but forms no part of this reissue specification; matter printed in italics indicates the additions made by reissue.

CROSS-REFERENCE TO RELATED APPLICATION

[This is a continuation of application Ser. No. 60/038,332 filed Feb. 27, 1997.

The present invention relates generally to a control system for use on friction welding machines for controlling the final angular orientation of two workpieces relative to each other that have been welded together using the friction welding process.]

*This application is a continuation of U.S. Pat. No. RE 39,019 filed Jan. 12, 2001, which is a reissue application of U.S. Pat. No. 5,858,142 filed Dec. 9, 1997 as U.S. patent application Ser. No. 08/987,493 which claims priority under 35 U.S.C. § 119(e) from U.S. Provisional Application Ser. No. 60/038,332 filed Feb. 27, 1997. The above-identified applications are incorporated herein by reference in their entirety.*

APPENDIX

A software computer program forming an appendix consisting of 5 pages is included as part of the specification.

IDENTIFICATION OF COPYRIGHT

A portion of the disclosure of this patent document contains material which is subject to copyright protection. The copyright owner has no objection to the facsimile reproduction by anyone of the patent document or the patent disclosure as it appears in the public Patent and Trademark Office patent file or records, but otherwise reserves all copyright rights whatsoever.

BACKGROUND OF THE INVENTION

Friction welding machines are generally well known in the art. In a friction weld, heat is generated by rubbing two workpieces together until the material at the interface between the two pieces reaches a plastic state. The two workpieces are then forged together under pressure to finalize the weld and expel gases, thus forming a single component having an integral bond. A friction weld can typically be formed in a very short period of time compared to more conventional are welding methods, and thus friction welds are less labor intensive, more uniform and more cost effective than conventional methods. Friction welders are especially well suited for welding round bars or tubes to each other, or for welding round workpieces to flat plates, disks or gears. The friction welding process is frequently used to produce automotive drive shafts, automotive air bag canisters, gear shafts and engine valves, as well as other applications in which a high quality weld is required.

On a friction welder, one of the workpieces is mounted to a rotating chuck assembly while the other workpiece is fixed in a stationary chuck or tailstock. A drive motor accelerates the rotating chuck to a predetermined speed, and the parts are then forced together with the friction induced heat producing a material flux. The pieces are then forged together under pressure, which expels gas and produces a fine grain weld.

Friction welders are generally divided into two categories, inertia friction welders and the more conventional direct drive friction welders. The rotating chuck on inertia friction welders is drivingly connected to a flywheel. A drive motor accelerates the flywheel to speed, the drive motor is then disconnected, and the kinetic energy stored in the flywheel is converted to heat energy as the two workpieces are formed together under extremely high pressure. The rotating chuck interface between the two workpieces. Inertia friction welding has a number of inherent drawbacks which makes it unsuitable for many applications. First, the flywheel bearings gradually heat up, which depletes the available kinetic energy because energy is lost through increased friction. Second, due to the very high forge pressure required, inertia welding is unsuitable for thin walled tubes and many soft metals, such as aluminum. In general, the quality and uniformity of inertia friction welds are hard to control.

On direct drive friction welders, the drive motor used to rotate one of the workpieces remains engaged until the weld is complete and the rotating workpieces comes to a halt. Unfortunately, the final orientation of the rotating workpiece relative to the stationary workpiece is not easily controlled. In many applications, it is critical that the two workpieces be welded together in a predetermined angular orientation relative to one another. For example, the yoke at one end of an automotive drive shaft must be perpendicular to the yoke at the other end of the drive shaft; otherwise, the drive line components will be prone to premature failure. Similarly, on many gear shafts and other components the gear at one end of the shaft must be precisely located relative to another gear or cam lobe on the shaft.

In order to achieve precise angular orientation a number of approaches have been attempted. For example, one prior art approach uses a defined braking mechanism which applies a braking force as the rotating spindle decelerates and approaches the desired final orientation which in turn is conveyed to the rotating spindle via an electronic signal or mark. Usually however, due to variations in the braking mechanism and other variables, the deceleration of the spindle is not uniform. Frequently, the brake must be released and the drive motor must be temporarily re-engaged in order to force the spindle to the desired location. Thus the rate of deceleration, as well as the final angular position of the rotating workpiece, is relatively uncontrolled. In many instances as the spindle approaches the desired stopping point, it becomes clear that the spindle has or will stop short of the desired alignment mark, while at other times the spindle will completely pass the mark. If the spindle stops short, the drive motor is re-engaged and the spindle is accelerated and driven to the mark. If the spindle overshoots the mark, the drive motor is re-engaged and the spindle is turned an extra rotation in order to reach the mark again. Unfortunately, in each instance the spindle has slowed significantly and the weld has already begun to cool and the material has begun to harden. Any subsequent accelerations and rotation of the spindle cause microfractures in the crystal structure of the material, resulting in a lower quality, high risk weld. Furthermore, the defined braking method is not accurate enough for many applications. In general, the defined braking method is unsuitable for applications in which the final angular orientation is critical and is also unsuitable for many aluminum welds, aircraft quality welds, air bag welds and other safety related welds.

Accordingly, there exists a need for a control system for friction welders that can control the final orientation of one workpiece relative to the other, and that consistently produces a uniform high quality weld suitable for use on aircraft and safety related applications and on a wide variety of material types.

SUMMARY OF THE INVENTION

The control system according to the present invention allows two workpieces to be welded together at a desired angular orientation. The control system of the present invention allows two pieces to be welded together with greater precision and accuracy than is possible with any of the prior art control methods. The control system constantly monitors the angular orientation of the spindle at any given point in time, and compares the present spindle orientation with a predetermined desired spindle orientation that has been calculated by a host computer. The computer calculates the desired orientation of the rotating spindle at any given moment during the weld process, including during the acceleration phase, the burn-off and weld phases, and through the deceleration phase until the spindle stops at the predetermined desired final angular orientation. The programmable host computer determines and calculates all of the critical weld parameters, depending on the material properties, weld characteristics, thickness, and rotating mass of the pieces to be welded together. Based upon this information, the computer generates a desired spindle profile curve which becomes a reference point for the desired speed and the desired angular position of the rotating spindle at every point during the weld process. Using the profile curve, a motion controller connected to and controlled by the central computer constantly compares the actual spindle orientation to the desired spindle orientation throughout the process, and makes the necessary corrections to ensure that the actual orientation conforms to the desired orientation.

A motion controller is operatively connected to the host computer, and generates a motion command or speed signal, which is communicated to a drive motor that drives the spindle. A position sensor is connected to the rotatable spindle, and a tachometer is connected to the drive motor. The position sensor and the drive motor communicate constant feedback to the motion controller regarding the present position of the rotatable spindle and the present speed of the drive motor. The present orientation is compared to the desired orientation for that particular moment in the weld cycle, and the motion controller constantly makes adjustments to the spindle speed, either by increasing or decreasing the speed, in order to conform the actual spindle orientation to the desired spindle orientation.

The control system employs a proportional-integral-derivative controller ("PID controller"), which enables the control system to respond very quickly to differences between the actual and the desired spindle orientation. The control system can thus respond very quickly to increases or decreases in friction between the two workpieces as the materials heat up and as the weld is being formed. At any given moment, parameters indicative of the present spindle orientation and the present spindle speed are sent to the motion controller, which compares the actual orientation to the desired orientation. The motion controller then makes any necessary corrections and varies the speed of the drive motor accordingly. Thus, by making the system more responsive, the angular orientation of the rotatable spindle at any given moment can be precisely controlled as can the rotational speed of the spindle. Each of these variables are constantly measured and compared to target values calculated and communicated by the host computer to the PID controller.

Accordingly, it is an object of this invention to provide an improved control system for friction welders.

It is another object of this invention to provide a control system for friction welders that allows two workpieces to be welded together in a precise angular orientation.

A further object of this invention is to provide a control system for friction welders that enables two workpieces to be welded together with much more precision than is possible in known existing friction welding methods.

These and other objects of the invention will become readily apparent to those skilled in the art upon a reading of the following description.

BRIEF DESCRIPTION OF THE DRAWINGS

FIG. 6 is a tabular representation of the input register, which contains the desired weld parameters and the material variables input by the operator for processing by the host computer; and FIG. 7 is a tabular representation of the output register, which represents each of the program parameters calculated by the host computer.

DETAILED DESCRIPTION OF THE INVENTION

Figure 1:
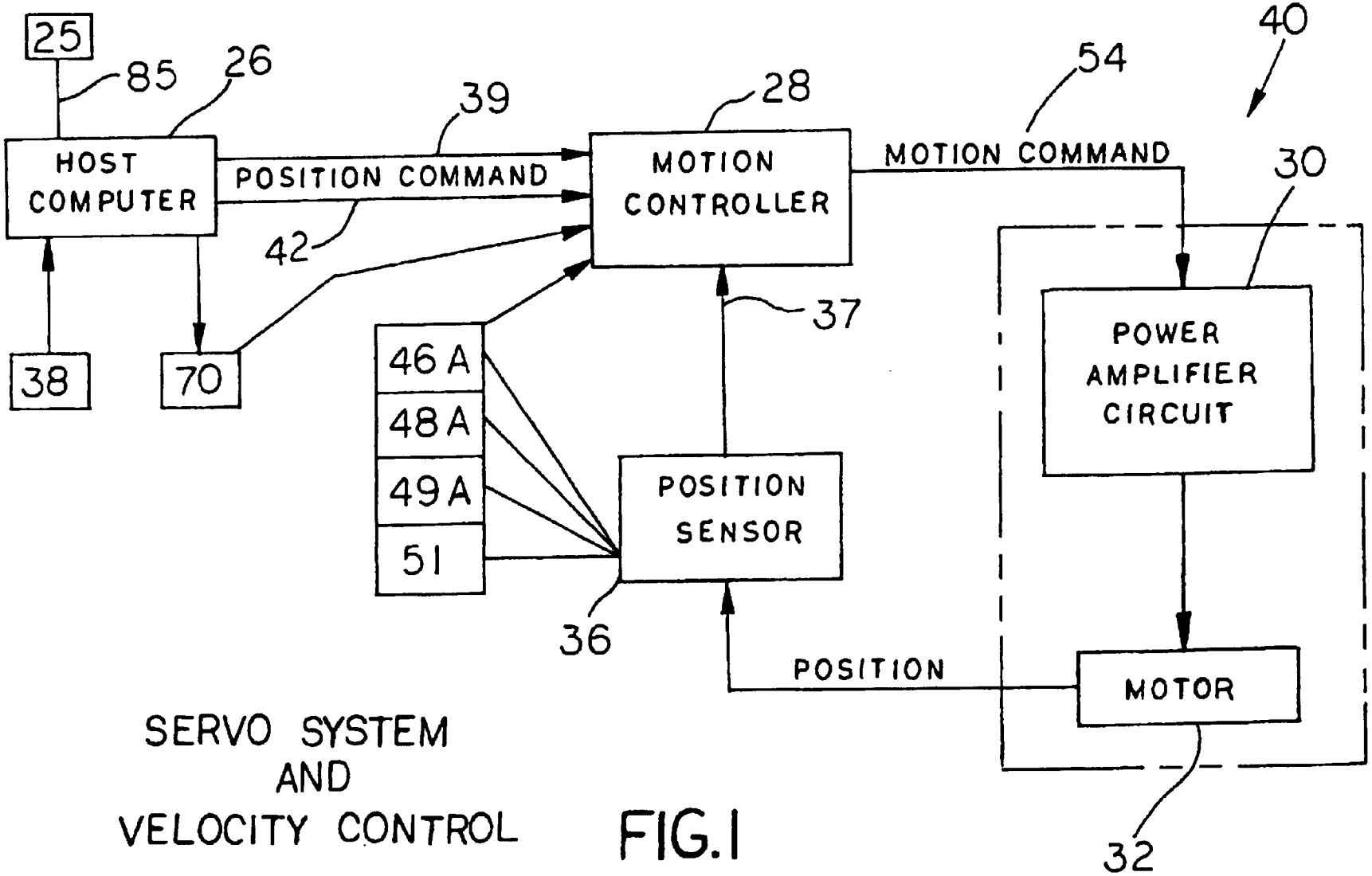
FIG. 1 is a schematic illustration of a friction welding control system incorporating the teachings of the present invention.
Figure 2:
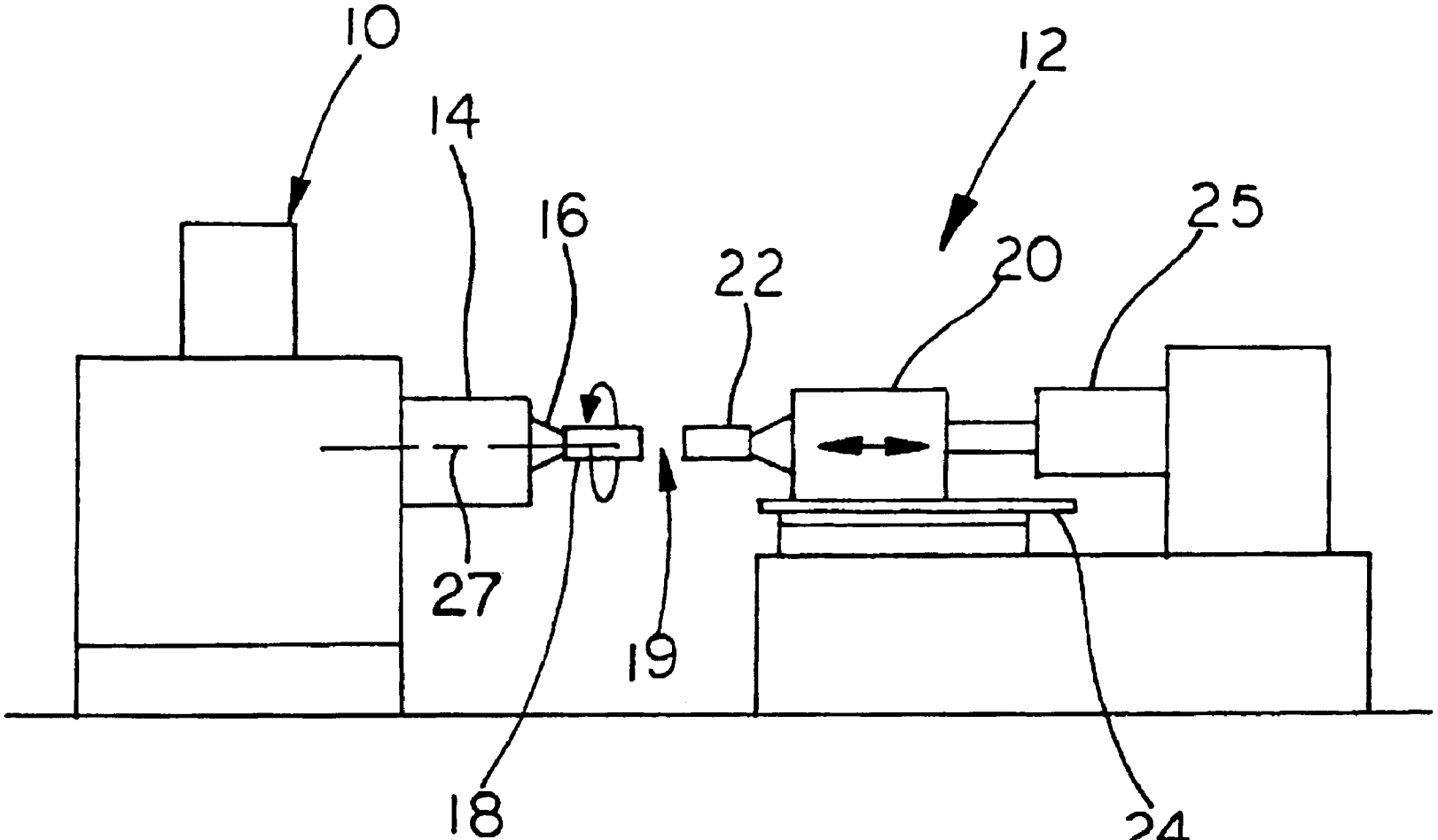
FIG. 2 is an elevational view of a friction welding machine having the control system of the present invention installed thereon.

The embodiment herein described is not intended to be exhaustive or to limit the invention to the precise form disclosed. It is chosen and described to explain the principles of the invention and its application and practical use to best enable others skilled in the art to follow its teachings.

Referring now to the drawings, a control system for a friction welder according to the present invention is generally indicated by the reference numeral 10. Control system 10 is operatively connected to and controls the operation of a friction welding device 12. Friction welder 12 includes a rotating spindle 14, having a chuck assembly 16 for securing a first workpiece 18, and a non-rotating chuck assembly or tailstock 20 for holding a second workpiece 22. Typically, tailstock 20 is slidably mounted to a track or slide 24. An actuator 25 enables tailstock 20 holding second workpiece 22 to move towards spindle 14 holding first workpiece 18 in a direction parallel to the axis 27 of rotating spindle 14, thus enabling first and second workpiece's 18, 22 to be brought into contact with each other.

Figure 4:
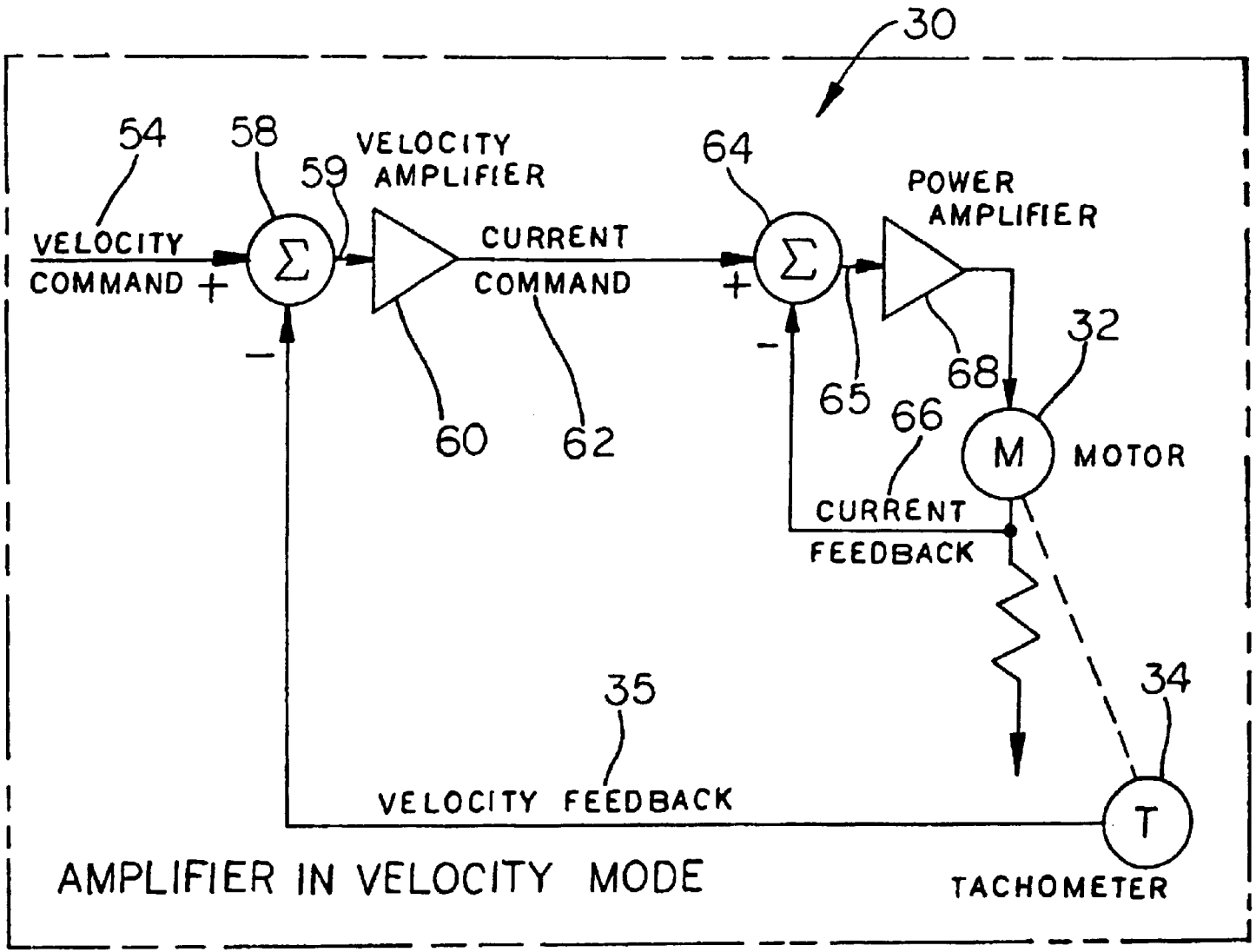
FIG. 4 is a schematic diagram of the amplifier circuit of the control loop shown in FIG. 1, which generates continuous feedback regarding the actual speed and position of the rotating spindle.

As shown in FIGS. 1 and 4, control system 10 includes a central or host computer 26 which is operatively connected to a motion controller 28 which in turn is operatively connected to a power amplifier 30, a drive motor 32 which includes a tachometer 34, and position sensor 36. Motion controller 28, power amplifier 30, motor 32, tachometer 34, and position sensor 36 together form a control loop 40. Drive motor 32 is preferably a variable speed drive motor commonly employed in the art, and tachometer 34 and position sensor 36 are likewise commonly employed in the art. Preferably, position sensor 36 is calibrated to measure the angular position of the spindle as it rotates about its axis in increments of a rotation, and position sensor converts the detected position to an actual position command 37. Position sensor 36 also tracks the actual number of rotations during each of the weld phases, such as the actual acceleration, pre-heat, heat and forge rotations 46A, 48A, 49A and 51 (see FIG. 1), respectively, as discussed below. Preferably, each complete rotation of the spindle can be broken into a thousand discrete angular positions. Based on a number of material variables input by the operator, such as the material weight, dimensions, and thickness of workpieces 18 and 22, host computer 26 generates a desired spindle profile 120 (shown in FIG. 5) which represents the desired rotational speed 53 of spindle 14 at any moment during the weld cycle. The desired final angular position 42 (see FIG. 6) of the first workpiece 18 relative to the second workpiece 22 about their common rotating axes is input into the computer via input register 38 and is communicated to motion controller 28. The operator inputs the material variables mentioned above into the host computer 26, which then calculates the desired total number of spindle rotations 44 (see FIG. 7) required between the actual starting position and the desired final position 42. The total number of desired rotations 44 includes the desired acceleration rotations 46, the desired pre-heat rotations 48, the desired heat rotations 49, and the desired forge rotations 50.

Tachometer 34 generates a signal which indicates the actual speed 35 (see FIG. 4) of the drive motor, while position sensor 36 (see FIG. 1) generates a signal which indicates the actual angular position 37 of the spindle 14. Based on the desired final position 42 and the actual position 37, motion controller 28 generates a motion command or speed signal 54 which is communicated to power amplifier circuit 30 and then to drive motor 32. Thus, a control loop 40 is formed which continuously generates feedback regarding the actual speed 35 and the actual position 37 of rotating spindle 14, which matches the actual speed and position of the first workpiece 18 held by chuck assembly 16. Ideally, actual speed 35 closely approximates desired speed 53 (see FIG. 7), while actual position 37 closely approximates the desired position 39. The desired position 39, which is generated by host computer 26 as explained below, represents the desired angular position of spindle 14 relative to its axis of rotation at any particular point in time during the weld cycle. Any differences between actual speed and/or position and desired speed and/or position are corrected by control loop 40 as discussed in greater detail below.

Referring now to FIG. 4, amplifier circuit 30 includes summation node or junction 58 which sums the difference between the speed signal 54 and the actual speed 35. Junction 58 generates a difference signal 59, which is communicated to velocity amplifier 60, which in turn generates a current command signal 62. Current command signal 62 is communicated to summation node or junction 64, which sums the difference between current command signal 62 and current feedback signal 66 from motor 32. Junction 64 generates a difference signal 65, which is communicated to amplifier 68, which is connected to drive motor 32.

Figure 3:
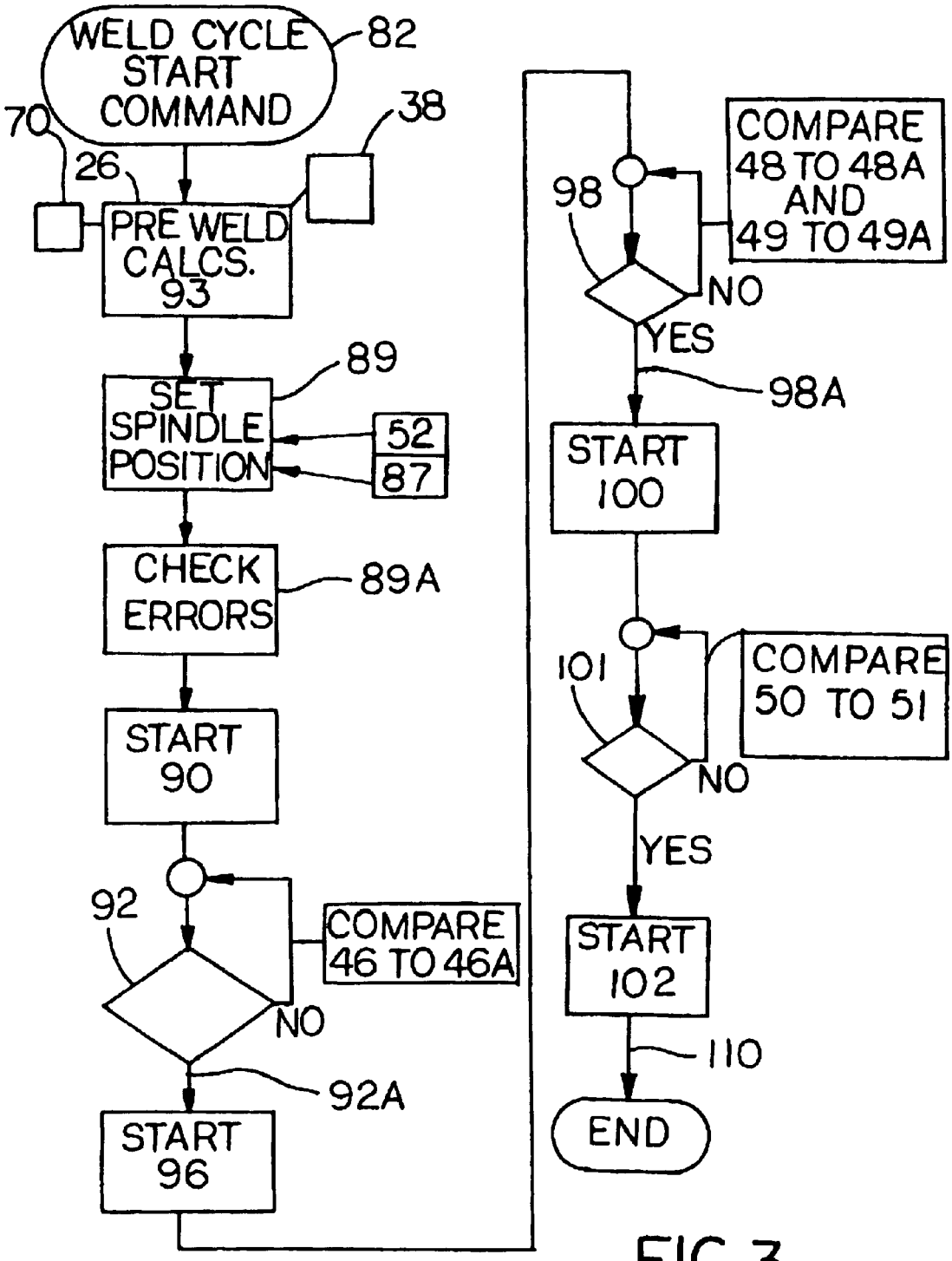
FIG. 3 is a flow chart of the main control program used to control the system illustrated in FIGS. 1 and 2.

FIG. 3 shows a flow chart of the weld cycle, while FIGS. 6 and 7 illustrate input register 38 and output register 70, respectively. The appendix which forms a part of this description is a source code for a specific weld operation which is appropriately down loaded from computer 26 into motion controller 28 after the various weld and material parameters for the operation have been generated by the host computer. Upon commencement or start 82 of the weld cycle, computer 26 performs a series of pre-weld calculations 93 which are reflected by the output numbers in register 70. The values for each of the output variables depend on a number of variables programmed into input register 70. The values for each of the output variables depend on a number of variables programmed into input register 38. The input variables include the type of material 73 to be welded, the weight 75 of the rotating workpiece, and the geometric or size properties 77 of the workpieces to be welded together. Input register 38 also includes the desired final angular orientation between the workpieces relative to their common axis (the desired final position 42 of rotatable workpiece 18 relative to non-rotatable workpiece 22), the lengths 76, 78 of the first and second workpieces, respectively, and the desired length 80 for the finished product. Computer 26 obtains values for a material constant (mC) 6 and a geometry constant (gC) 8 from a pre-programmed Lookup Table as is common industry practice. Based on the values programmed into input register 38 for variables 73, 75 and 77, as well as the values obtained for constants 6, 8, the computer 26 then calculates and outputs the rotational moment of inertia 72 (see FIG. 7). Computer 26 also calculates and outputs the target upset distance 74, which is a linear measurement of the amount of material lost during the weld process, by adding the length 76 of workpiece 18 and the length 78 of workpiece 22, and subtracting the desired length 80 of the final welded product. The values for lengths 76, 78 and 80 are input into the computer 26 by the operator via input register 38. Computer 26 also outputs the required pre-heat force level 79, the required heat force level 81, and the required forge force level 83, which tells actuator 25 how hard to press the first workpiece and the second workpiece together during different phases of the weld cycle, all of which are calculated using conventional engineering principles. Computer 26 also calculates the required pre-heat time 61 (T1 to Ta), which is the length of time required to complete the pre-heat process, and also calculates the pre-heat distance 63, which represents the distance traveled by the second workpiece 22 as it travels towards the first workpiece 18 along slide or track 24. Similarly, computer 26 calculates the required heat time 65 (Ta to T2) and heat distance 67, the required forge time 69 (T2 to T3) and required forge distance 71, all of which is calculated using conventional engineering principles based on the material variables input by the operator. The sum of the pre-heat distance 63, the heat distance 67 and the forge distance 71 equals the total upset distance 74. Finally, based on the desired rotational speed 53 of the spindle during the weld phase, the computer calculates the number of pre-heat rotations 48 required in order to pre-heat the material at the required pre-heat force level 79, the number of heating rotations 49 required to heat the material at the interface to a plastic state at the calculated heat force level 81, as well as the number of forge rotation 50 required for the spindle to stop at the desired angular position 42 at the calculated forge force level 83.

When the operator initiates the start command 82, the computer 26 performs the pre-weld calculations 93 and creates the output register 70, which contains values for each of the variables 39, 44, 46, 48, 49, 50, 53, 61, 63, 65, 67, 69, 71, 72, 74, 79, 81 and 83 as shown in FIG. 7. Computer 26 generates the spindle profile curve 120 shown in FIG. 5, and also sets the start position of slide 24 so that the total travel of slide 24 will match the desired upset distance 74. Before the spindle rotation begins, a subroutine 89 causes motion controller 28 to orient the spindle 14 (the actual spindle position 37) at a setpoint or "home" mark 87. Next, a status subrotation 89A communicates the presence of any spindle positional errors to the host computer 26 before motion controller 28 begins spindle rotation and initiates a correction of such errors through motion controller 28. Upon completion of subroutine 89 with an indication of no errors, subroutine 89A communicates a go command to motion controller 28, which in turn communicates a speed signal 54 to drive motor 32 commencing the rotation of spindle 14.

Figure 5:
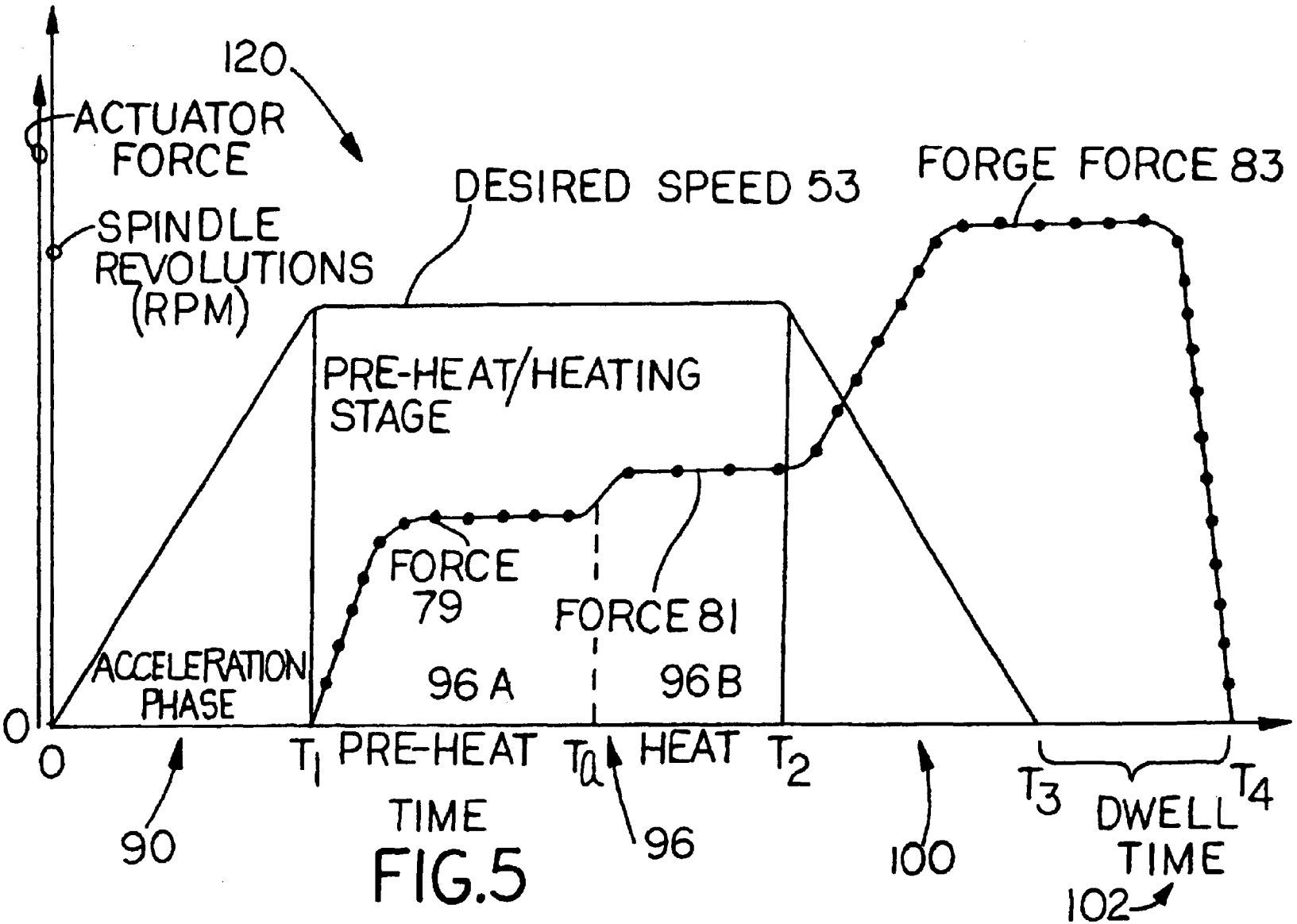
FIG. 5 is a spindle profile curve in graphic form which indicates the desired spindle speed as a function of time during the entire weld process.

As shown in FIG. 5, the first phase of the weld cycle is the acceleration phase 90, during which the spindle is accelerated to a desired rotational speed 53. During acceleration phase 90, subroutine 92 (see FIG. 3) via control loop 40 constantly compares the actual spindle acceleration rotations 46A, in increments of 1/1000th of a revolution, to the desired spindle acceleration rotations 46 as dictated by the spindle profile 120 for that particular moment during the acceleration phase 90. Motion controller 28 makes the necessary speed adjustments via speed signal 54 as required, and the comparison by subroutine 92 continues until the acceleration phase 90 is complete. Subroutine 92 typically triggers the completion of the acceleration phase by monitoring the total spindle rotations for that phase, but may also be programmed to trigger the end of the first phase 90 based on elapsed time. Next, status subroutine 92A commences which communicates the presence of any positional errors to the host computer 26 before commencement of the next stage. If any positional errors have been detected, such as the incorrect number of rotations during the acceleration phase or the improper angular position of the spindle 14 at the end of the phase, subroutine 92A communicates the error(s) to computer 26, which can immediately recalculate the remaining portions of spindle profile 120 for the subsequent phases in order to obtain the correct final angular position.

Upon completion of subroutine 92A, a signal is sent to computer 26 which indicates that the second phase 96 is about to commence. Phase 96, which commences at a time indicated by time T1 in FIG. 5, includes both a pre-heat phase 96A and a heating phase 96B. Phase 96B terminates when the material at interface 19 has reached a plastic state, which should coincide with the completion of the desired pre-heat rotations 48 and the desired heating rotations 49, and which signals the end of phase 96. At the beginning of phase 96, spindle 14 is rotating at the desired rotation or weld speed 53, and motion controller 28 via control loop 40 maintains the rotation of spindle 14 at this desired speed. During the pre-heat stage 96A, computer 26 sends a force command 85 to actuator 25, which brings the workpiece 22 into contact with workpiece 18 at the pre-heat pressure force level 79, followed by stage 96B which through actuator 25 causes workpiece 22 to be continuously forced against workpiece 18 at a specific heat pressure force level 81. The friction between workpiece 18 and workpiece 22 immediately begins to heat the interface 19 between the workpieces at the commencement of stage 96A, and the heating continues through stage 96B. During phase 96, subroutine 98 via control loop 40 constantly compares the actual pre-heat rotations 48A, in increments of 1/1000th of a revolution, to the desired pre-heat rotations 48, plus the desired number heating rotations 49 to the actual heating rotations 49A as dictated by the spindle profile 120 for that particular moment during phase 96. Meanwhile, motion controller 28 makes any necessary speed adjustments via speed signal 54. When subroutine 98 detects that the total heating rotations 49 have been completed with the material at the workpiece interface 19 reaching a plastic state, subroutine 98 indicates the completion of phase 96 by sending a signal to computer 26. Next, status subroutine 98A commences the presence of any errors in the position of spindle 14 to the host computer 26. Upon completion of subroutine 98A with an indication of no errors, subroutine 98A communicates a command to computer 26 to commence the next phase.

Phase 96 is followed by a forge phase 100 which commences at time T2, and which terminates when the desired forge rotations 50 have been completed and the spindle rotation has stopped, which occurs at time T3. During forge phase 100, spindle 14 decelerates in accordance with profile curve 120. Forge phase 100 is in turn followed by a dwell phase 102 in which the two workpieces are maintained under pressure as the material at workpiece interface 19 cools, with phase 102 terminating at time T4. At the initiation of the forge phase 100, motion controller 28 begins decelerating the spindle 14, and subroutine 101 via control loop 40 constantly compares the desired forge rotations 50, in increments of 1/1000th of a revolution, to the actual forge rotations 51 as dictated by the spindle profile 120 for that particular moment during phase 100, and motion controller 28 makes the necessary speed adjustments via speed signal 54. The comparison by subroutine 101 continues until the forge phase 100 is complete at time T3, at which point the spindle 14 has stopped at the desired final position 42. Also during the forge phase 100, as the spindle 14 begins to slow down, computer 26 sends a signal to actuator 25, which causes an increase in pressure between first workpiece 18 and second workpiece 22 up to the forge force level 83.

When spindle 14 stops, computer 26 measures the actual travel of actuator 25 and compares the actual upset length 104 to the desired upset length 74 and determines if the actual upset 104 is within bounds. Subroutine 110 monitors the time under forge pressure, and sends a signal to computer 26 when the dwell time is complete, which occurs at time T4. At time T4, the forge pressure is released and the weld cycle is complete. Finally, motion controller 28 reports any final positional errors to computer 26, which can be communicated to the operator.

The invention is not to be limited to the following claims but it may be modified within the scope of the claims.

APPENDIX

```
rem *** Inertia Friction Welding Inc
rem *** Copyright 1996
rem *** All rights reserved
rem
rem
rem *** Inertia Friction Welding Inc
rem *** Copyright 1996
rem *** All rights reserved
rem
rem *** #MAIN
rem This is the main program task
#MAIN
JS #INIT
XQ #IDLE,1
#MAIN1
JS #CYCLE,@IN[1]=0;
JS #HOME,HPB=1;
JS #WELD1,RPB=1;
JS #MAIN1
EN
rem End #MAIN*********************
rem *** Inertia Friction Welding Inc
rem *** Copyright 1996
rem *** All rights reserved
rem
rem *** #HOME
rem Home function
#HOME
HX 1;
HPB=0;
```

APPENDIX-continued

```
MG "HOME"
XYHomed=0;
HomeIP=1;
RevLS=0;ForLS=0;
ER HomeFE;
AC HomeAcc;
DC HomeDec;
KP HomeP;
KI HomeI;
KD HomeD:
IL 2;VT 1;
#HOMEX
MG "Homing . . . ";
StatMsg="HOMEX:"
rem Make sure of home switch
MG "Get off 'home switch . . . ";
JG FIVel;BGX;
#WFX2;JP #WFX2,@IN[2]=0;
WT 500
STX;AMX;JP #HOMEX,@IN[2]=0;
MG "Off Home switch . . . ";
rem Find home LS
MG "Looking for home switch . . . ";
#WFX1;
PR -5;BG;AMX;
JP #WFX1,@IN[2]=1;XPos=_TPX;
MG "Home switch found . . . ";
rem
rem Go back to home position
SP FIVel;
PA XPos;BG;AM;DP0;
MG "Slides Homed . . . ";
#HOME1
XYHomed=1;
XQ #IDLE,1
EN
rem End #HOME*********************
rem *** Inertia Friction Welding Inc
rem *** Copyright 1996
rem *** All rights reserved
rem
rem *** #POSERR
rem Position following error
#POSERR
ZS;
JS #HALT;
MG "FOLLOWING ERROR"
StatMsg="FOLERR"
ZS;Jp #MAIN;
RE
rem End #POSERR ******************
rem *** Inertia Friction Welding Inc
rem *** Copyright 1996
rem *** All rights reserved
rem
rem *** #HALT
rem Brings motion to a stop
#HALT
StatMsg="HALT"
ER*=10000;II 0;AB 1;WT 1000;
SH;CS;HX 1;MO;
OP255;
rem JS #CLEARIO;
MG "Servo program halted . . . "
EN
rem end #HALT********************
rem *** Inertia Friction Welding Inc
rem *** Copyright 1996
rem *** All rights reserved
rem
#IDLE
IdleTM=TIME
#IDLE1
JP #IDLE1,TIME-IdleTM<1000;
ITime=ITime+1;
MG "Servo Ready . . . ",ITime{F6}
JP #IDLE;
EN
rem End #IDLE ********************
```

APPENDIX-continued

```
rem *** Inertia Friction Welding Inc
rem *** Copyright 1996
rem *** All rights reserved
rem
#INIT
SB 1;SB 2;SB 3;SB 4;
SB 5;SB 6;SB 7;SB 8;
ER*=1000;
OE*=1;
TL 1;
GN 1;
AC 500;
DC 500;
KP .2;
KI .05;
KD 0;
HPB=0;
RPB=0;
XYHomed=0;
IdleTM=0;
ITime=0;
JS #INITGL
JS #INITWL
EN;
rem End #INIT **************
rem *** Inertia Friction Welding Inc
rem *** Copyright 1996
rem *** All rights reserved
rem
#WELD1
HX 1
RPB=0;
MG "Weld Cycle Started"
ER*=WeldFE;
OE*=1;
rem
TL WeldTL;
GN WeldGN;
SP WeldSP;
AC WeldAC;
DC WeldDC;
KP WeldKP;
KI WeldKI;
KD WeldKD;
Dist=PPR*WeldRev;
Dist2=Dist-(PPR*TrigRev);
PR Dist;
TW 500;
BGX;
MG "Scrub . . . "
rem Scrub start
AT 0;
AT ScrubTM;
rem Burn start
CB1;
MG "Burn . . . "
AD Dist2;
rem WT500
rem Forge Start
CB 2;
SB 1;
MG "Forge . . . "
AMX;
KP WeldKP2;
WT ForgeTM;
SB 2
MG "Weld complete"
WT 10000
KP WeldKP;
EN;
rem End #WELD1 ********************
rem
#CYCLE
JS #HOME,XYHomed=0;
JS #WELD1;
XQ #IDLE,1
EN
rem End #CYCLE ******************
#MCTIME
```

APPENDIX-continued

```
MG "Position timeout . . . "
RE
rem End WELD/CYCLE MODULE ********
rem
#INITGL
rem
rem GLOBAL VARIABLES
rem
rem
rem PULSES PER INCH
PPI=10000.000000
rem PULSES PER REV
PPR=7941.22449
rem Timer Ticks Per Second
TPS=1000
rem   Input Volts Per Unit
IVltPRPM=2.000000
IVltPPSI=3.000000
rem   Output Volts Per Unit
OVltPRPM=2.000000
OVltPPSI=3.000000
rem Sample Rate
SampleRt=100
rem Number of IO
rem Homing following error counts
HomeFE=2000;
HomeVel=1000;
HomeAcc=500;
HomeDec=500;
HomeP=.8;
HomeI=.02;
HomeD=0;
GHomeVel=1000;
FIVel=1000;
rem Software limits
XFLimit=11.000
YFLimit=11.000
XBLimit=-0.100
YBLimit=-0.100
InvertIO=1
rem Max Move Values
MaxXMVel=10
MaxXMAcc=40
MaxXMDec=40
EN
rem
rem Weld start values
#INITWL
rem *** Inertia Friction Welding Inc
rem *** Copyright 1996
rem *** All rights reserved
rem
rem Weld specific params
WeldRPM=1750
ScrubTM=2000;
ForgeTM=4000;
WeldRevS=10
Degrees=0
TrigRev=0.5
rem
rem PID params
WeldAcc=100
WeldDec=100
WeldKP=0.5
WeldKP2=1
WeldKI=0.02
WeldKD=50
WeldFErr=1.5
WeldTL=9.9988
WeldGN=20
rem
rem Calculated parameters
WeldRev=(Degrees/360)+WeldRevS;
WeldSP=(WeldRPM*PPR)/60;
WeldAC=(WeldAcc*PPR)/60;
WeldDC=(WeldDec*PPR)/60;
WeldFE=WeldFErr*PPR;
rem
rem End weld.txt **************
```

APPENDIX-continued

```
EN
rem End #INITLW ******************
```

What is claimed:

[1. A method of friction welding first and second parts together having a specific axial orientation relative to each other in which said first part is mounted to a spindle for axial rotation said second part is mounted to a non-rotatable holder moveable toward said spindle along the axis of rotation of said first part, comprising the steps:

a. causing said spindle and mounted first part to be rotated at a desirable speed while determining the angular axial orientation of said first part relative to said second part at any specific time, b. moving said holder toward said spindle to bring said second part into frictional contact with said first part at a selected one said specific time to cause heating of said first and second parts and the melting of the respective contacting surfaces thereof, c. then decreasing the speed of rotation of said spindle and mounted first part and simultaneously moving said holder towards said spindle to forcibly urge said first and second parts together at said contacting surfaces, and d. stopping rotation of said spindle and mounted first part at a specific determined angular axial orientation of said first part relative to said second part while still forcibly urging said first and second parts together to allow cooling and fused solidification of said contacting surfaces.]

[2. The method of claim 1 wherein step b includes bringing said first and second parts into frictional contact at a first pressure force with the combined axial length of said first and second parts being reduced a specific distance followed by a second pressure force greater than said first pressure force with the combined axial length of said first and second parts being further reduced a second specific distance while maintaining said first desirable speed.]

[3. The method of claim 2 wherein step c also includes applying a third pressure force greater than said second pressure force to said first and second parts with the combined axial length of said first and second parts being reduced a third specific distance.]

[4. The method of claim 3 including monitoring the angular axial orientation of said first part relative to said second part during steps a, b, c, and d.]

[5. The method of claim 4 wherein step d includes applying a forge force to said first and second parts for a specific dwell time.]

[6. The method of claim 1 including determining responsive to one or more material characteristics of said first and second parts said desirable speed, said one specific time, and amount of force utilized to so force said first and second parts together during rotation of said spindle and mounted first part.]

[7. The method of claim 1 including monitoring said angular axial orientation of said second part of said first and second parts relative to each other and adjusting the rotational speed of said spindle to arrive at said specific determining angular axial orientation of said first part relative to said second part.]

[8. The method of claim 1 including adjusting the rotational speed of said spindle during steps b to effect said melting of the contacting surfaces of said first and second parts.]

*9. An apparatus for controlling a friction welding machine, comprising:*

*a motion controller operatively coupled to a motor for rotating a spindle;*

*a position sensor operatively coupled to the motion controller and the spindle, the position sensor arranged to determine an actual spindle position and further arranged to communicate the actual spindle position to the motion controller;*

*a computing device operatively coupled to the motion controller, the computing device arranged to calculate a set of output parameters from a set of input parameters and to generate a spindle profile based on the set of output parameters, the computing device further arranged to communicate the spindle profile to the motion controller, the spindle profile indicative of a desired spindle position and a desired spindle angular velocity;*

*the motion controller further arranged to measure a first deviation between the actual spindle position and the desired spindle position, the first deviation measured at a first time point on the spindle profile, the motion controller further arranged to adjust an angular velocity of the spindle to reduce a second deviation measured at a second time point.*

*10. The apparatus of claim 9, wherein the set of input parameters includes at least one of a material constant, a geometric constant, a desired final spindle position, a material type, a workpiece weight, a workpiece geometric property, a first workpiece length, a second workpiece length, and a desired finished workpiece length.*

*11. The apparatus of claim 9, wherein the output parameters include at least one of the desired spindle position, a desired total number of spindle rotations, a desired number of spindle acceleration rotations, a desired number of spindle pre-heat rotations, a desired number of spindle heating rotations, an actual number of spindle forge rotations, a desired spindle rotational speed, a desired time at a pre-heat spindle force level, a desired pre-heat distance, a desired heat distance, a required time at a forge force level, a desired forge distance, a rotational moment of inertia, a target upset distance, a desired pre-heat force level, a desired heat force level, and a desired forge force level.*

*12. The apparatus of claim 9, wherein the computing device is arranged to compare the desired spindle position to the actual spindle position and to calculate a deviation, the computing device further arranged to compare the deviation to a threshold deviation and to calculate a replacement spindle profile if the deviation exceeds the threshold deviation.*

*13. The apparatus of claim 9, wherein the spindle profile includes an acceleration phase, a pre-heat phase, a heating phase, and a forge phase.*

*14. The apparatus of claim 9, wherein the computing device is further programmed to send a force command to an actuator, wherein the actuator is arranged to move a tailstock a desired distance relative to the spindle based on the force command.*

*15. The apparatus of claim 14, wherein the force command is indicative of a desired force level applied to the workpiece.*

*16. The apparatus of claim 14, wherein the computing device is arranged to calculate a force profile indicative of a desired force applied by the actuator over a force application time period.*

*17. The apparatus of claim 16, wherein the force profile includes a pre-heat force phase, a heat force phase, and a forge force phase.*

*18. The apparatus of claim 16, wherein the force profile is indicative of a desired travel distance of the tailstock.*

*19. The apparatus of claim 18, wherein the force profile includes a pre-heat distance, a heat distance, a forge distance, and a target upset distance.*

*20. The apparatus of claim 14, wherein the computing device is arranged to measure an actual travel distance of the actuator.*

*21. The apparatus of claim 20, wherein the computing device is arranged to measure a deviation between the actual travel distance and a desired travel distance, and further arranged to determine whether the deviation is greater than a threshold deviation.*

*22. The apparatus of claim 16, wherein the computing device is arranged to change the force profile in response to changes in the spindle profile.*

*23. The apparatus of claim 14, wherein the computing device is arranged to calculate a new spindle profile in response to changes in the set of input parameters, and is further arranged to change the force command in response to calculation of the new spindle profile.*

*24. The apparatus of claim 9, wherein the spindle profile includes an acceleration phase and a forge phase.*

*25. The apparatus of claim 16, wherein the force profile includes a single forge phase.*

*26. The apparatus of claim 14, wherein the motor is arranged to apply a reduced force to the spindle.*

*27. The apparatus of claim 26, wherein the motor is arranged to apply a force only when the spindle profile requires acceleration of the spindle.*

*28. The apparatus of claim 27, wherein the computing device is arranged to calculate an actual spindle angular velocity of the spindle based on the spindle position over time, the computing device further arranged to calculate a replacement spindle profile when the actual angular velocity falls below the desired spindle angular velocity by a predetermined threshold.*

*29. The apparatus of claim 28, wherein the computing device is arranged to control the spindle position and spindle angular velocity by adjusting the force command and wherein the motor is arranged to apply a reduced driving force.*

*30. A control loop for use on an angular orientation control system of a friction welder, the control loop comprising:*

*a motion controller operatively coupled to a computing device;*

*a power amplifier circuit coupled to the motion controller;*

*a rotatable spindle driven by a motor, the motor operatively coupled to the power amplifier;*

*a tachometer arranged to determine the rotational speed of at least one of the motor and the spindle;*

*a position sensor operatively coupled to the spindle and the motion controller and arranged to determine the rotational position of the spindle;*

*the motion controller arranged to:*

*receive a command set indicating at least one of a desired spindle speed and a desired spindle angular position;*

*receive a signal from the position sensor indicating an actual spindle angular position; and*

*send a motion command to the power amplifier circuit, the motion command indicative of a speed change based on the desired spindle speed and the difference between the desired spindle angular position and the actual spindle angular position;*

*and*

*wherein the power amplifier circuit is arranged to adjust the motor based on the motion command and the actual spindle speed.*

*31. The system of claim 30, wherein the power amplifier circuit is arranged to:*

*receive a motion command from the motion controller indicative of the desired angular velocity of the spindle;*

*compare the actual spindle angular velocity to the desired spindle angular velocity at a specific time point and generate a difference signal;*

*wherein the difference signal is amplified and sent to the motor.*

*32. The system of claim 30, wherein the computing device is arranged to generate the command set.*

*33. The system of claim 30, wherein the motion controller is arranged to send a status signal to the computing device indicative of a difference signal.*

*34. The system of claim 33, wherein the computing device is arranged to calculate a new command set when the difference signal exceeds a threshold.*

*35. The system of claim 30, wherein the tachometer is coupled to the power amplifier.*

*36. The system of claim 30, wherein the motor controller is a proportional-integral-derivative controller.*

*37. An apparatus for controlling a friction welding machine, the friction welding machine including a rotatable spindle and a non-rotatable tailstock and further comprising:*

*a motor for rotating a spindle, the motor arranged to engage the spindle;*

*a motion controller operatively coupled to a motor, the motion controller arranged to adjust an angular velocity of the spindle;*

*a computing device operatively coupled to the motion controller;*

*a position sensor operatively coupled to the spindle and at least one of the motion controller and the computing device, the position sensor arranged to determine an actual spindle position and further arranged to communicate the actual spindle position to the at least one of the motion controller and the computing device; and*

*an actuator operatively coupled to the computing device, the actuator arranged to apply a force to the tailstock and thereby move the tailstock relative to the spindle;*

*wherein the computing device is arranged to calculate a set of output parameters from a set of input parameters and to generate a spindle profile and a force profile based on the set of output parameters, the computing device further arranged to communicate a portion of the spindle profile to the motion controller and arranged to communicate the force profile to the actuator, the force profile indicative of the force applied by the actuator.*

*38. The apparatus of claim 37, wherein the spindle profile is indicative of at least one of a desired spindle angular velocity and a desired spindle position at a point in time.*

*39. The apparatus of claim 37, wherein the force profile is indicative of a force command at a point in time.*

*40. The apparatus of claim 39, wherein the force command is indicative of at least one of a desired force applied to the tailstock and a desired travel distance of the tailstock.*

*41. The apparatus of claim 40, wherein the computing device is arranged to measure a first deviation between the actual spindle position and the desired spindle position, the first deviation measured at a first time point on the spindle profile, the computing device further arranged to adjust the force command to reduce a second deviation measured at a second time point.*

*42. The apparatus of claim 37, wherein the computing device incorporates a proportional-integral-derivative controller.*

*43. The apparatus of claim 37, wherein the motion controller is integrated with the computing device.*

*44. The apparatus of claim 37, wherein the computing device is arranged to measure a deviation between the actual spindle position and the desired spindle position, the deviation measured at a first time point on the spindle profile, the computing device further arranged to calculate a new spindle profile if the deviation exceeds the threshold deviation.*

*45. The apparatus of claim 44, wherein the computing device is arranged to change the force profile in response to a change in the spindle profile.*

*46. The apparatus of claim 37, wherein the motor is arranged to apply a reduced driving force to the spindle once a predetermined angular velocity is achieved.*

*47. The apparatus of claim 46, wherein the computing device generates a new spindle profile when the actual angular velocity falls below the desired angular velocity by a predetermined threshold, the new spindle profile achieving the same final angular position as the previous spindle profile.*

*48. The apparatus of claim 47, wherein the computing device is arranged to decrease the actual spindle angular velocity to match the desired spindle angular velocity of the new profile curve by increasing the force of the actuator.*

*49. A method of using a friction welding machine to weld a pair of workpieces together at a desired final angular orientation relative to each other, the friction welding machine including a rotatable spindle and a non-rotatable tailstock, the method comprising the steps of:*

*calculating a set of weld parameters used to control the friction welding machine, the set of weld parameters including a desired spindle position;*

*mounting a first one of the pair of workpieces to the rotatable spindle and a second one of the pair of workpieces to the non-rotatable tailstock;*

*rotating the rotatable spindle;*

*applying a force to press the pair of workpieces together;*

*measuring at least one of an actual spindle speed and an actual spindle position to produce a measurement;*

*comparing the measurement with at least one of the desired spindle speed and desired spindle position;*

*adjusting the applied force so that the actual spindle position is substantially similar to the desired spindle position.*

* * * * *